Jan. 14, 1958     A. C. MORGANSTERN     2,819,823
SALT AND PEPPER SHAKER SETS
Filed May 8, 1957

INVENTOR
ALFRED C. MORGANSTERN
BY *Alfred W. Petchaft*
ATTORNEY

United States Patent Office 2,819,823
Patented Jan. 14, 1958

2,819,823
SALT AND PEPPER SHAKER SETS
Alfred C. Morganstern, Belleville, Ill.
Application May 8, 1957, Serial No. 657,973
8 Claims. (222—142.3)

This invention relates in general to novelty tableware and, more particularly, to a salt and pepper shaker set.

Salt and pepper shakers are frequently designed within a common holder as a set both for reasons of artistic taste as well as convenience and utility. When desired, the salt and pepper shakers are manually removed from such frame or housing, and this operation is frequently rendered somewhat difficult by reason of the fact that the housings or frames do not afford ready access to the individual shakers so that the shakers themselves are difficult to grip with the fingers.

It is, therefore, one of the objects of the present invention to provide a salt and pepper shaker set wherein the shakers are attractively fitted within a housing and present an interesting, attractive appearance.

It is also an object of the present invention to provide a salt and pepper shaker set having a novel housing wherein the shakers are disposed in such a manner that they are normally fully within the housing but are flush with the top of the housing.

It is a further object of the present invention to provide a salt and pepper shaker set of the type stated wherein the shakers can be quickly and easily displaced with respect to the housing for convenient manual removal.

It is an additional object of the present invention to provide a salt and pepper shaker set of the type stated which is relatively inexpensive to manufacture.

With the above and other objects in view, my invention resides in the novel features of form, construction, arrangement, and combination of parts presently described and pointed out in the claims.

In the accompanying drawing—

Figure 1:
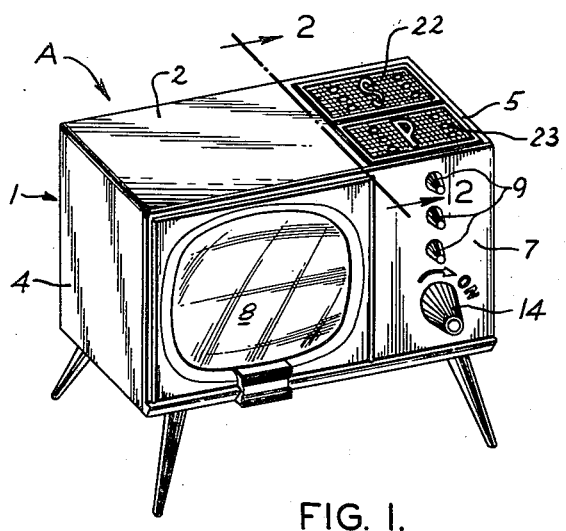
Fig. 1 is a perspective view of a salt and pepper shaker set constructed in accordance with and embodying the present invention.
Figure 2:
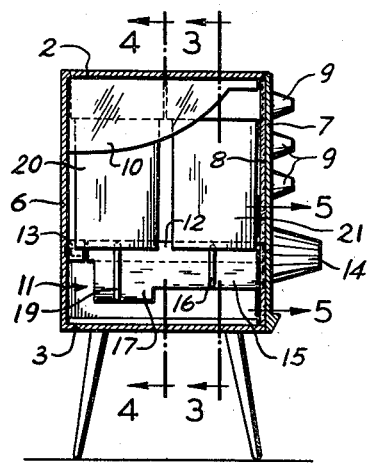
Fig. 2 is a sectional view taken along line 2—2 of Fig. 1.
Figure 3:
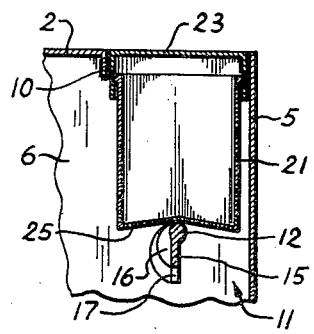
Figure 4:
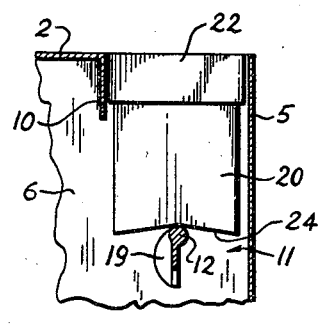
Figure 6:
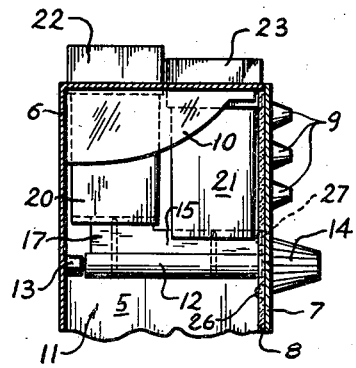
Figure 7:
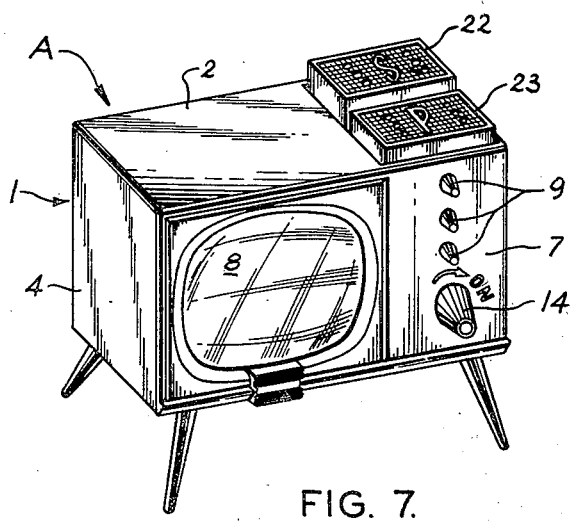
Figure 5:
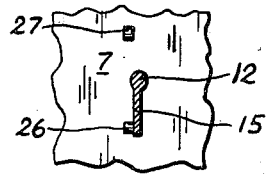

Figs. 3, 4, and 5 are fragmentary sectional views taken along lines 3—3, 4—4, and 5—5, respectively, of Fig. 2;

Fig. 6 is a sectional view similar to Fig. 2 and showing the shakers in position for removal from the housing; and Fig. 7 is a perspective view similar to Fig. 1 and showing the shakers in position for removal from the housing.

Referring now in more detail and by reference characters to the drawing, which illustrates a preferred embodiment of the present invention, A designates a salt and pepper shaker set including a hollow, box-like housing 1 formed of a molded phenol-formaldehyde resin or other suitable hard plastic material. The housing 1, which, for purposes of illustration herein, is designed as a miniature simulation of a television console, is formed with top and bottom walls 2, 3, side walls 4, 5, a rear wall 6, and a front wall 7, the latter being provided on one half with a translucent, ornamental plate 8 and on its other half with a series of fixed ornamental knobs 9. Integrally provided on one end of the top wall 2 is an arcuate wall-like partition member 10 which projects downwardly into the housing 1 and forms with the bottom wall 3, the rear wall 6, the front wall 7, and the side wall 5, a chamber 11.

Extending between the back wall 6 and the front wall 7 in upwardly spaced relation from the bottom wall 3 is a shaft 12, one end of which is journaled in a boss 13 integrally formed on the rear wall 6, the other end of the shaft 12 projecting through the front wall 7 and being provided with a manipulating knob 14. Integrally formed on the shaft 12 is a thin radially outwardly extending plate-like portion 15 integrally provided with a small semi-circular cam member 16, and contiguous with the plate-like portion 15 is a second, somewhat longer plate-like portion 17 integrally provided with a large semi-circular cam member 19, the latter being of a somewhat larger diameter than the cam member 16 and being in spaced parallel relationship thereto.

Positioned within the chamber 11 and resting on the shaft 12 are two substantially identical hollow rectangular shakers 20, 21, each provided with perforated removable caps 22, 23, which are of such size that they normally form a continuation of the top wall 2, as shown in Figs. 1 and 2. Suitable identifying indicia, such as "S" and "P" may be provided on the caps 22, 23. The shakers 20, 21, are each formed with V-shaped bottom walls 24, 25, which normally rest upon the shaft 12 in overlying relation to the cam members 16, 19.

In use, the shakers 20, 21, are normally in the position shown in Figs. 1 through 4, and wherein the plate-like portion 15 abuts a lower stop pin 26 integrally formed on the inside of the front wall 7. In such position, the upper surface of the caps 22, 23, are coplanar with the top wall 2. When it is desired to remove either of the shakers 20, 21, from the housing 1, the knob 14 is rotated in the direction shown by the arrow in Fig. 1, whereupon the cam members 16, 19, bear against the bottom walls 24, 25, to elevate the shakers 20, 21, so that they project a short distance upwardly from the top wall 2, as shown in Figs. 6 and 7. In actual practice, the shaft 12 will be rotated somewhat more than 180° until the plate-like portion 15 abuts an upper stop pin 27 integrally formed on the inside of the front wall 7. It will be apparent that since the cam member 19 is of larger diameter than the cam member 16, the shaker 20 will be elevated a slightly greater distance than the shaker 21, and either shaker can be individually removed as desired. At such times as the shakers are replaced, they may be retracted within the chamber 11 by reverse rotation of the knob 14.

It should be understood that changes and modifications in the form, construction, arrangement, and combination of the several parts of the salt and pepper shaker sets may be made and substituted for those herein shown and described without departing from the nature and principle of my invention.

Having thus described my invention, what I claim and desire to secure by Letters Patent is:

1. A salt and pepper shaker set comprising a housing having a top wall, said housing furthermore having a chamber, the mouth of which is adjacent said top wall, a pair of shakers removably positioned within said chamber, each of said shakers being provided with planar bottom walls arranged to form a V-shaped bottom, cap members mounted on the upper ends of said shakers and being normally coplanar with said top wall, a shaft rotatably mounted within the housing and extending across said chamber, means on said shaft for engaging said V-shaped bottoms and thereby support the shakers within said chamber, and auxiliary means on said shaft for shifting said shakers upwardly through the mouth of said chamber in response to manual actuation of the shaft.

2. A salt and pepper shaker set comprising a housing having a chamber therein and having a rectangular aperture opening into said chamber, a pair of hollow rectilinear shakers removably disposed within said chamber and presented at one end through said opening, means within the housing for normally supporting said shakers in such manner that their tops are substantially flush with each other and with said aperture, said shakers each being free to move shiftably through said aperture for removal from the housing and bearing slidably against marginal portions of said aperture so as to be guided thereby, and mechanical means operatively mounted in the housing for simultaneously shifting said shakers outwardly through the aperture of said housing chamber to permit manual engripping and removal of said shakers.

3. A salt and pepper shaker set comprising a housing having an open-topped chamber therein, a plurality of shakers removably disposed in said chamber, and mechanical means operatively mounted in the housing for shifting said shakers upwardly through the open top of said housing, said mechanical means including a shaft-like member rotatably mounted in and projecting at one end through the housing, a rocking element projecting radially from the shaft, and stop means within the housing for holding the shaft-like means and its associated rocking elements in an initial position of rest, said shakers being adapted to stand upon and be supported by said shaft-like means and its associated rocking element.

4. A salt and pepper shaker set comprising a housing having a chamber therein and having an aperture opening into said chamber, a plurality of shakers removably disposed in said chamber, and mechanical means operatively mounted in the housing for simultaneously shifting said shakers outwardly through the aperture of said housing, said mechanical means including a shaft-like member rotatably mounted in and projecting at one end through the housing, a rocking element projecting radially from the shaft, and stop means within the housing for holding the shaft-like means and its associated rocking elements in an initial position of rest, said shakers being adapted to stand upon and be supported by said shaft-like means and its associated rocking element, said shakers being of such dimensions that, when supported by said shaft-like means and its associated rocking element in the initial position of rest, the tops of the shakers will be substantially flush with the opening into said chamber.

5. A salt and pepper shaker set comprising a housing having a top portion which is substantially open to provide an aperture, said housing furthermore having a chamber opening upwardly through said aperture, a pair of shakers removably disposed within said chamber so that the tops thereof are substantially flush with said portion and are presented to said aperture, and mechanical means operatively mounted in the housing for simultaneously shifting said shakers unequal distances outwardly through the aperture to permit either shaker to be separately gripped and removed.

6. A salt and pepper shaker set comprising a housing having a top portion which is substantially open to provide an aperture, said housing furthermore having a chamber opening upwardly through said aperture, a pair of shakers removably disposed within said chamber so that the tops thereof are substantially flush with said top portion and are presented to said aperture, a shaft rotatably mounted within the housing and extending across said chamber, and separate elements carried by and spaced axially along said shaft for respectively engaging and simultaneously shifting said shakers unequal distances through the aperture of said housing to permit either shaker to be separately gripped and manually removed.

7. A salt and pepper shaker set comprising a housing having a top portion which is substantially open to provide an aperture, said housing furthermore having a chamber opening upwardly through said aperture, a pair of shakers removably disposed within said chamber so that the tops thereof are substantially flush with said top portion and are presented to said aperture, a shaft rotatably mounted within the housing and extending across said chamber, and spaced arcuate cam means on said shaft for shifting said shakers unequal distances upwardly through the mouth of said chamber.

8. A salt and pepper shaker set comprising a housing having a top portion which is substantially open to provide an aperture, said housing furthermore having a chamber opening upwardly through said aperture, a pair of shakers removably disposed within said chamber so that the tops thereof are substantially flush with said top portion and are presented to said aperture, a shaft rotatably mounted within the housing and extending across said chamber, and spaced arcuate cam means on said shaft each of said cam means having camming surfaces which are respectively at different radial distances from the axis of the shaft for shifting said shakers unequal distances upwardly through the mouth of said chamber.

References Cited in the file of this patent

UNITED STATES PATENTS

| Number | Name | Date |
|---|---|---|
| 353,021 | Davis | Nov. 23, 1886 |
| 1,099,067 | Lines | June 2, 1914 |
| 1,467,805 | Meyberg | Sept. 11, 1923 |
| 1,575,506 | Rogers | Mar. 2, 1926 |
| 1,587,468 | Burkey et al. | June 1, 1926 |
| 1,802,123 | Mohen | Apr. 21, 1931 |
| 2,125,845 | Larkin | Aug. 2, 1938 |
| 2,229,426 | Tanner | Jan. 21, 1941 |
| 2,292,651 | Olevin | Aug. 11, 1942 |
| 2,427,218 | Liebson | Sept. 9, 1947 |
| 2,572,737 | Lehner | Oct. 23, 1951 |